United States Patent

Waugh

[11] Patent Number: 5,838,136
[45] Date of Patent: Nov. 17, 1998

[54] 3-POLE BATTERY SWITCHES

[75] Inventor: Iain Wallace Waugh, Hamilton, New Zealand

[73] Assignee: GloryWin International Group Limited, Central, Hong Kong

[21] Appl. No.: 379,631
[22] PCT Filed: Aug. 16, 1993
[86] PCT No.: PCT/NZ93/00067
 § 371 Date: Feb. 3, 1995
 § 102(e) Date: Feb. 3, 1995
[87] PCT Pub. No.: WO94/04394
 PCT Pub. Date: Mar. 3, 1994

[30] Foreign Application Priority Data

Aug. 18, 1992 [NZ] New Zealand .......................... 244007
Apr. 27, 1993 [NZ] New Zealand .......................... 247509

[51] Int. Cl.[6] .................................................. H01M 10/46
[52] U.S. Cl. .................................. 320/6; 320/15; 320/35; 320/39
[58] Field of Search .............................. 320/6, 7, 15, 16, 320/17, 27, 29, 30, 48, 56, 35, 39

[56] References Cited

U.S. PATENT DOCUMENTS 4,883,728 11/1989 Witehira ................................. 429/160
4,902,956  2/1990 Sloan ....................................... 320/13
4,990,885  2/1991 Irick et al. ........................... 320/6 X
5,154,985 10/1992 Tanaka .
5,162,164 11/1992 Dougherty et al. .
5,164,273 11/1992 Szasz et al. .
5,256,502 10/1993 Kump .

OTHER PUBLICATIONS

European Patent Abstracts, Week 9247, p. 114, Abstract of EP 513531–A1, published Nov. 19, 1992.
Japanese Publication 5–258656–A, published Aug. 10, 1993, Abstract only.
Patent Abstracts of Japan, Group M185, vol. 7, No. 9, Published Jan. 14, 1983, Japanese Publication 57–167844, published Oct. 15, 1982, Abstract only.

*Primary Examiner*—Edward Tso
*Attorney, Agent, or Firm*—Seidel, Gonda, Lavorgna & Monaco, PC

[57] ABSTRACT

In 3-pole vehicle batteries with a cranking battery (2) and an auxiliaries battery (8) a device accompanies the battery wherein a switch R1 connects and disconnects the like poles (6,12) so that may receive charge and a switch R2 which connects and disconnects electrical auxiliaries to and from the auxiliary battery. The device senses the state of charge of the auxiliary battery and the current flowing from the auxiliaries battery to the cranking battery. A microprocessor $\mu P$ uses this and extra data to open R2 and prevent any serious discharge of the auxiliaries battery; to close R1 to permit charging of the cranking battery and to allow the cranking battery to assist a partially discharged auxiliaries battery; to open R1 when overcharge is indicated. In a second version only switch R1 is present but a detector senses the operator's requirement to start the vehicle and closes R1 to join the outputs of the cranking and auxiliaries batteries.

23 Claims, 9 Drawing Sheets

3-POLE BATTERY SWITCHES

TECHNICAL FIELD

This invention concerns switches used in adapting three pole batteries to the wiring loom of a vehicle. The switch is intended for use in automobiles with petrol or diesel motors, vessels, aircraft and other vehicles where battery failure could be hazardous.

BACKGROUND ART

The three pole battery contains two batteries. Firstly a deep cycle auxiliaries battery (AUX) used to meet small constant loads such as ignition, headlights, radio and other ancillary devices and secondly a high output CRA battery (CRA), The battery has one negative pole, a positive pole for the AUX battery and a positive pole for the CRA battery. This dual current capability means that the battery cannot be installed into the original wiring loom of the vehicle and function automatically without the assistance of a control system to control the mutual connection of the two batteries, making the current source totally independent of operator error.

A vehicle ignition system /engine management system can draw up to 10A. Ancillary circuits e.g air conditioning and heated rear window may need 30A or more if they are switched on together. These demands are met by the AUX battery. Cranking may need a short term current in excess of 700A U.S. Pat. No. 4,883,728 describes an SLI battery with three poles and a switch for adapting the battery to the wiring loom of a vehicle. This switch deals inadequately with the problems which occur in practice in adapting the binary battery to the vehicle.

The division of the battery into two halves imposes specific duties on the switch. Firstly the switch must connect the CRA and AUX batteries for charging. Secondly the switch must protect the CRA battery from inadvertent discharge if some auxiliary is left on and the vehicle is unattended.

Thirdly the switch must prevent gradual discharge of the CRA battery when the vehicle is being driven, for example a city taxi in heavy traffic running its heater, wipers, radio and lights easily exceeds its alternator output. Trucks have winches that draw 100 amps. Emergency service vehicles face the same problem but in addition they have extra lights, medical apparatus, monitors and the like. The device must be able to handle loads such as these. The switch must be able to provide to the ignition at least from the CRA battery after alternator failure when insufficient power is available from the AUX battery. The switch should also maximise the reserve minutes available in an emergency such as alternator failure.

Fourthly the switch must connect both batteries for starting the vehicle in the event that the AUX battery is discharged.

Fifthly when both batteries are charged the CRA battery voltage drops as it turns the starter motor but the AUX battery should supply the ignition with full voltage. The "hot" spark made possible by disconnecting the batteries promotes reliable starting in cold climates.

In addition the switch must react to charging, discharging and the driver's need to start the vehicle. It is also preferable that the switch be easy to fit, be as universal as possible, perform equally in all the types of vehicle in which it is fitted, have a lifespan on a par with the battery and if possible the vehicle itself, have a low power consumption, be reliable enough for emergency services, marine or military applications and be suitable for mass production at low cost.

The design of such switches has become more complex as new combinations of circumstances have arisen during testing. Some of these conditions do not occur in two pole battery operation. Firstly it is usual to connect the CRA and AUX batteries by a relay which itself draws current and slowly flattens the battery.

Secondly if the AUX battery is to be protected by a relay the level of charge at which cut out occurs must be determined. Too high and the driver is deprived of lights and heater when there is still current to run them; too low and the driver may seriously discharge the battery. There are various ways to assess the stage at which the relay should disconnect. Terminal voltage alone is an unreliable indicator. The terminal voltage is highly affected by current draw i.e the state of battery charge cannot be estimated by available voltage alone. If a small load is imposed on the AUX battery, the latter becomes discharged without much noticeable drop in available voltage but if a large load is then imposed there is an immediate large fall in voltage. The charge remaining in the battery tends to vary proportionally with the prevailing load. Current cut out while driving must be impossible in order to avoid an accident.

In cold climates discharged the battery electrolyte may freeze so if possible the cut out voltage must be selected with consideration for the prevention of freezing Thirdly it is possible to protect the AUX battery from severe discharge by disconnection from auxiliaries when the voltage drops below a predetermined value. Fourthly the CRA battery should be protected from a tendency, to overcharge. A cut out can provide such protection when the battery becomes too hot. Ambient under-bonnet temperatures vary considerably. The operational threshold for the cut out is difficult in practice to fix for satisfactory results.

Japanese patent document 3-49541 A describes the provision of a pair of batteries in a vehicle to ensure starting both connected to the auxiliaries to prevent errors at changeover and a switch for changing the load from one to the other when a predetermined fall in voltage is detected in the battery under load.

Japanese patent document no 4-20244 discloses a protection circuit for a vehicle battery in which an audible alarm warns the driver that the lights have been left on when parking and when the sensed battery voltage falls to the designed threshold he circuit switches off the lights.

U.S. Pat. No. 4,990,885 discloses a monitor for CRA and AUX 2-pole batteries used in a truck. Relay R1 connects the AUX and CRA batteries for charging whenever :he alternator runs. Relay R2 connects the AUX battery to electrical auxiliaries. An electronic voltage sensor alerts the driver to a level of AUX battery discharge that requires load reduction. The driver must then decide how to reduce the load.

U.S. Pat. No. 4,902,956 discloses a safety device for a conventional battery which disconnects the batteries from the auxiliaries when a microprocessor instructs disconnection based on the state of charge of the battery. The auxiliaries disconnect sequentially in banks. The operator must manually reconnect. This approach is not applicable to 3-pole batteries where two switches and priorities exist. None of these address the problems discussed above.

SUMMARY OF THE INVENTION

The invention provides in a vehicle electrical system as described above, a device for connection between the like poles of the battery having (a) a normally open switch R1 connecting the CRA and AUX batteries (b) a normally closed switch R2 connecting the AUX to the electrical auxiliaries (c) sensing means which detect the state of charge of the AUX battery and any current from the AUX battery to the CRA battery and which (i) connects and disconnects the CRA battery and the AUX battery and (ii) connects and disconnects the AUX battery to and from the electrical auxiliaries so as to enable the system to charge both CRA and AUX batteries and to meet fluctuating loads. This switch provides an auxiliary battery protection device comprising a switch which disconnects the auxiliaries from the AUX battery in dependence upon the state of charge in the AUX battery.

The switch may be a latching relay. Such relay imposes no quiescent current draw on the battery. The state of charge may be assessed by measuring both current and voltage available in the AUX battery. The assessment may be refined by reference to the prevailing temperature, electrolyte concentration, battery age and internal resistance.

If at full charge, 12.68 v is available then a fall in voltage to 12.1 v is small but may mask a low current availability. According the switch must refer to both values before connection or disconnection ensues. Alternatively the rate of change of voltage may be measured and used to operate the relay. Thus the auxiliary voltage is sampled periodically and v is used to derive a signal which works the relay. The aim is to keep a charge of useful size in the AUX battery. Very deep discharges prematurely age the battery.

An apparatus feature of the invention provides a data handling assembly for use in a battery control device comprising (a) data storage means suitable for storing data representing battery current, voltage, temperature, vehicle disturbance detection or engine starting (b) data entry means suitable for entering data concerning battery current ,voltage, temperature, vehicle disturbance detection or engine starting (c) comparing means which compare the current available to the auxiliaries with the state of charge of the AUX battery and generates a signal which connects or disconnects the auxiliaries in order to preserve the state of charge.

Preferably the state of charge which results in disconnection is 10% of maximum charge in temperate ambient temperature i.e 2° C. and above. In colder climates such as Canada where winter temperatures may fall to −35° C. the state of charge would be set at 60% of maximum.

Preferably also the comparing means compares the current flowing between the AUX and the CRA batteries with values in the data storage means in order to open or close a relay connecting the CRA and AUX batteries thereby preserving the state of charge thereof.

This invention provides a switch for connection between the two like poles of a binary battery having a CRA battery and an AUX battery wherein the switch incorporates a relay which connects in response to the detection on one side of the ignition switch of a test voltage applied to the opposite side of the switch indicating that the driver wishes to start the vehicle Improved operation of the switch results if the relay disconnects in response to a voltage fall to a predetermined level in the AUX battery. Reconnection preferably occurs when the voltage exceeds another predetermined level.

The switch operation may also be improved if the relay OPENS when the switch detects a current in excess of a predetermined maximum flowing from the auxiliary battery to the cranking battery. Thus the switch may connect and disconnect the two batteries in response to voltage sensing, excessive current flow and a detected start condition.

The invention also provides a switch incorporating a relay which opens in response to any two of the above conditions.

Concerning voltage sensing referred to above the relay may open when the auxiliary battery voltage falls within a predetermined range the lower end of which is 12.55 v A reference voltage may be delivered by a band gap generator to a comparator which compares the available voltage at the auxiliary battery with the reference voltage and the resultant signal may operate the relay. The relay closes at 12.9 v and opens at 12.55 by hysteresis in the circuit. This precludes unecessary relay operation in response to small voltage drops caused by auxiliaries such as trafficators.

The signal voltage may be derived from an isolated supply which is not referenced to the vehicle's earth. As there is a very low resistance path from one side of the switch to the opposite side via the vehicle earth system a blocking diode may be inserted between the ignition switch and the starter solenoid.

If an isolated voltage supply were introduced to the conductor connecting the AUX positive to the ignition switch, the voltage would normally sink down an auxiliary but is unable to complete a circuit through the starter solenoid because of the blocking diode The provision of an isolated voltage and the blocking diode ensure that the relay is initially closed and then opened for vehicle starting. This presents the separate outputs of CRA battery for cranking a cold motor and auxiliary battery for the provision of a hot spark.

The isolated voltage could instead be generated by the engine computer but the above means is economical and effective because it exerts its control with minimal disturbance to the vehicle electrics and no redesign such as engine computer revision is necessary.

In another version the keyswitch itself would be modified to make the isolated voltage supply independent but this specification looks at adaptive proposals rather than redesign pathways.

Turning the key to the START position may cause the relay to latch in the connected state for 30 sec however the relay disconnects and stays latched in the disconnected state for 6 sec if the overcurrent connection circuit detects that both batteries are charged. Separation of the two batteries will provide a hot spark In practice many charge\discharge states arise in the vehicle SLI battery and it is possible for any of the three sensing conditions providing input to the switch concerning the operation of the relay to override the other two. Key position tends to exert priority, but only at starting.

Thus the device affords the advantage of an expert system. No human intervention is required.

BRIEF DESCRIPTION OF THE DRAWINGS

An embodiment of the invention is now described with reference to the accompanying drawings wherein:

FIG. 8 is a circuit diagram of the FIG. 5 version.

BEST MODE OF CARRYING OUT THE INVENTION

Figure 1:
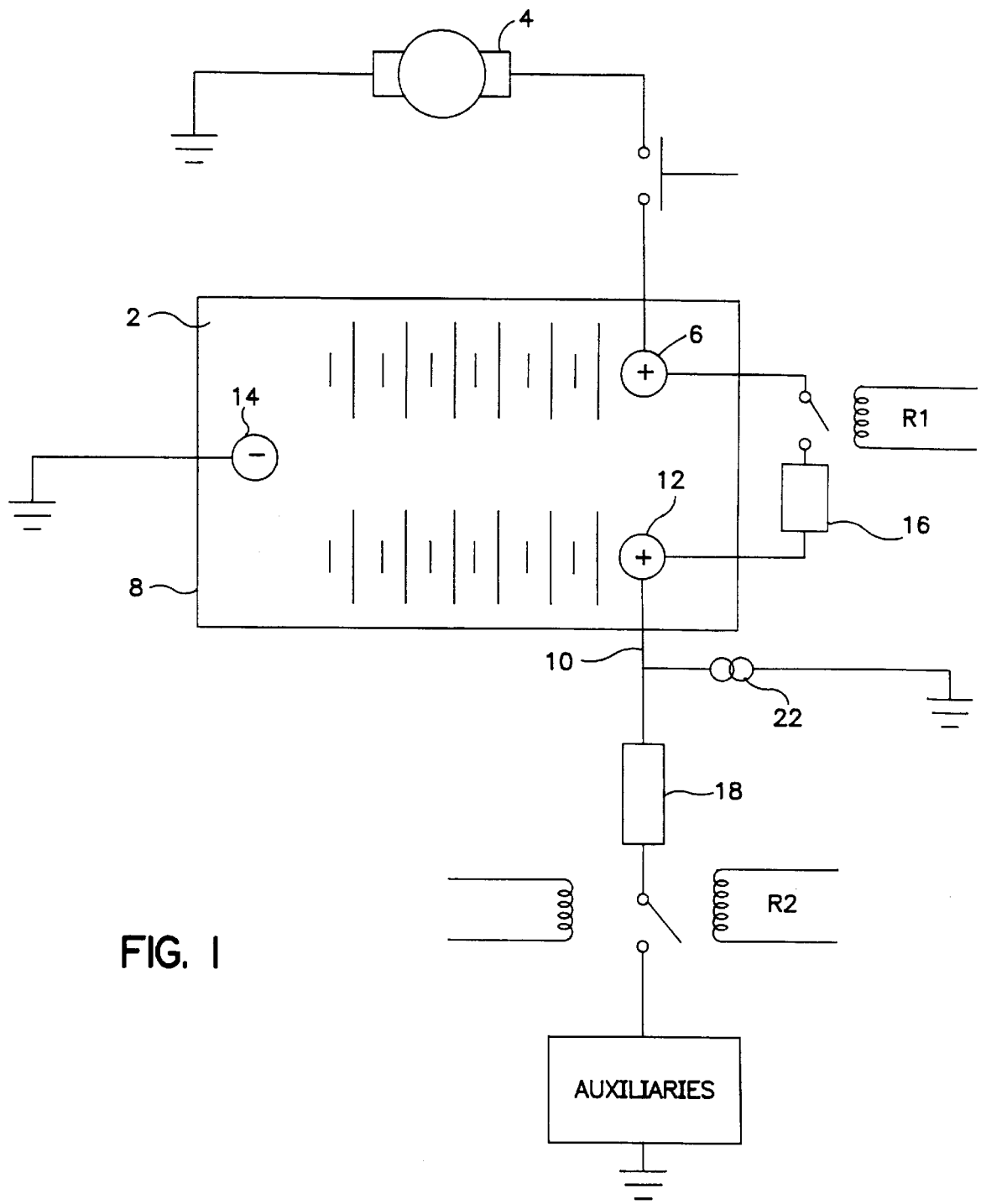
FIG. 1 is a diagram of a three pole battery and the two relays forming part of the switch.

Referring firstly to FIG. 1, CRA battery 2 is connected to starter motor 4 through pole 6 and AUX battery 8 is connected to the auxiliaries (not shown) by conductor 10 from pole 12. Pole 14 serves both batteries. Like poles 6 and 12 are connected and disconnected by relay R1 which receives signals from the interface circuits of an S G S Thompson ST6220 microprocessor MP (see FIG. 3). The current flowing from the AUX battery to the CRA battery when R1 is closed is detected by current sensor 16. The sensor is a shunt. A value for the magnitude of the current, from 0–255 is fed to a data entry bus in the microprocessor MP.

A like sensor 18 evaluates the AUX current in conductor 10. A voltage sensor 22 (FIG. 1) connected in parallel evaluates the auxiliary voltage. Two further inputs reach the buses in the microprocessor; battery temperature from semi conductor LM 337 detector (not shown) and a piezo disc (FIG.3) which senses movements such as driver entry and engine running. These too become input data for the microprocessor and are given codes in like manner. The range of inputs are shown in FIG. 4.

R1 is normally open and an output signal from the microprocessor closes the relay and connects the batteries so that their outputs are summed. R1 opens and closes continually during running, in order to charge both batteries. R2 is normally closed. As shown in FIG. 1, R2 has an ON coil and an OFF coil and is bistable so pulses of current suffice to change its state. R2 opens only infrequently to correct a situation which is likely to lead to disabling discharge.

The operation of R2 is improved by the provision of a transistor Q5 (FIG 3) in parallel with the relay for R2. When R2 closes transistor Q5 remains on but when the vehicle is immobile; no movement has been detected for 30 sec; the power consumption of the auxiliaries falls to less than 2 amps and no incoming charging current is detected, that is the voltage at the AUX terminal is less than on the auxiliaries, R2 disconnects saving 100 mA and the transistor Q5 becomes the sole conductor for the auxiliaries.

When the microprocessor detects that the AUX battery voltage has fallen to a predetermined caution level then the transistor Q5 is switched off saving the AUX battery. If while the transistor Q5 is switched on, movement is detected, current use increases or voltage on the auxiliaries is greater than the AUX battery, R2 connects. Thus the transistor Q5 assists when the vehicle is not in use and no large loads are imposed.

Figure 2A:
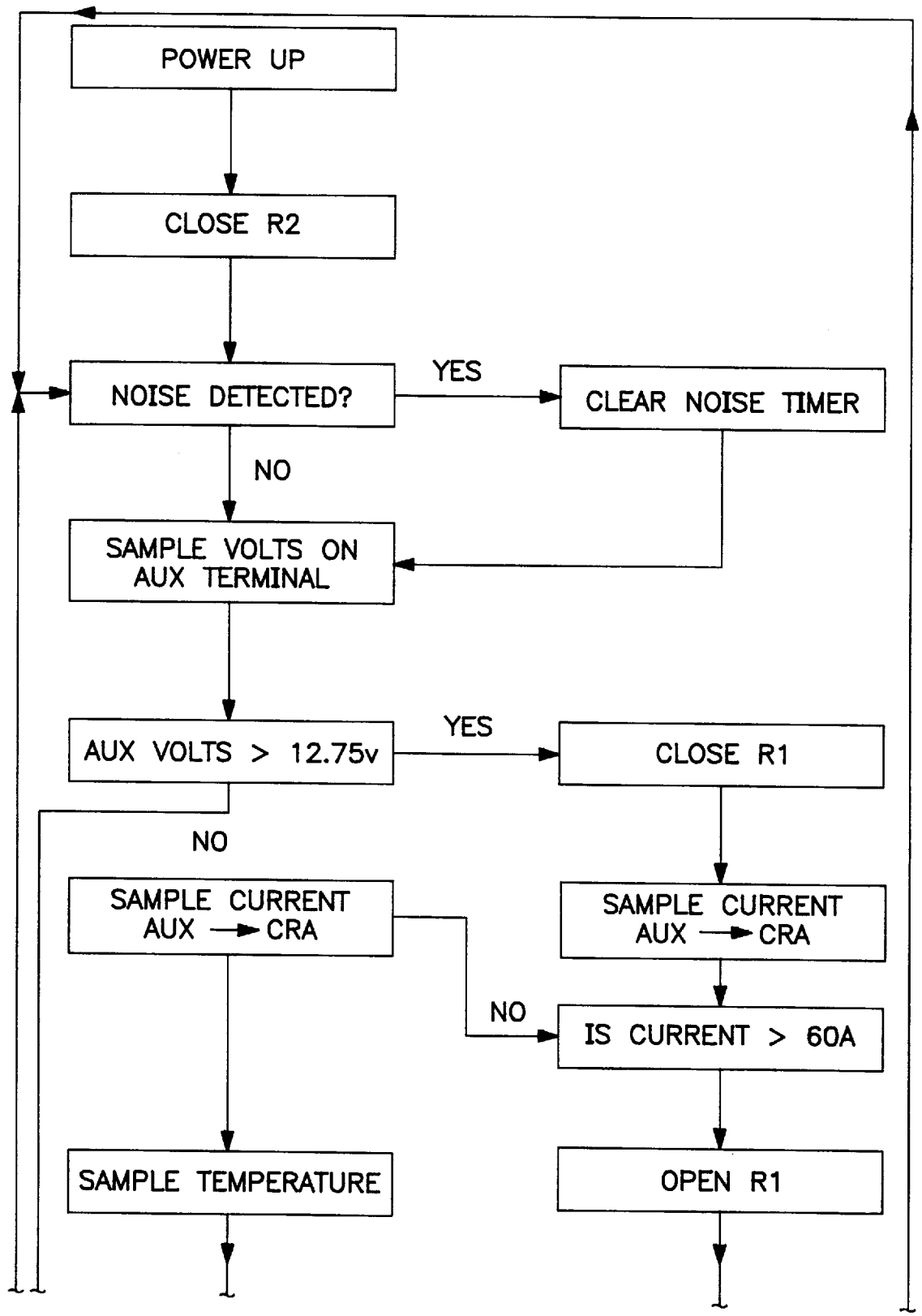
FIG. 2 A, B & C is a flow chart of the switch.
Figure 2B:
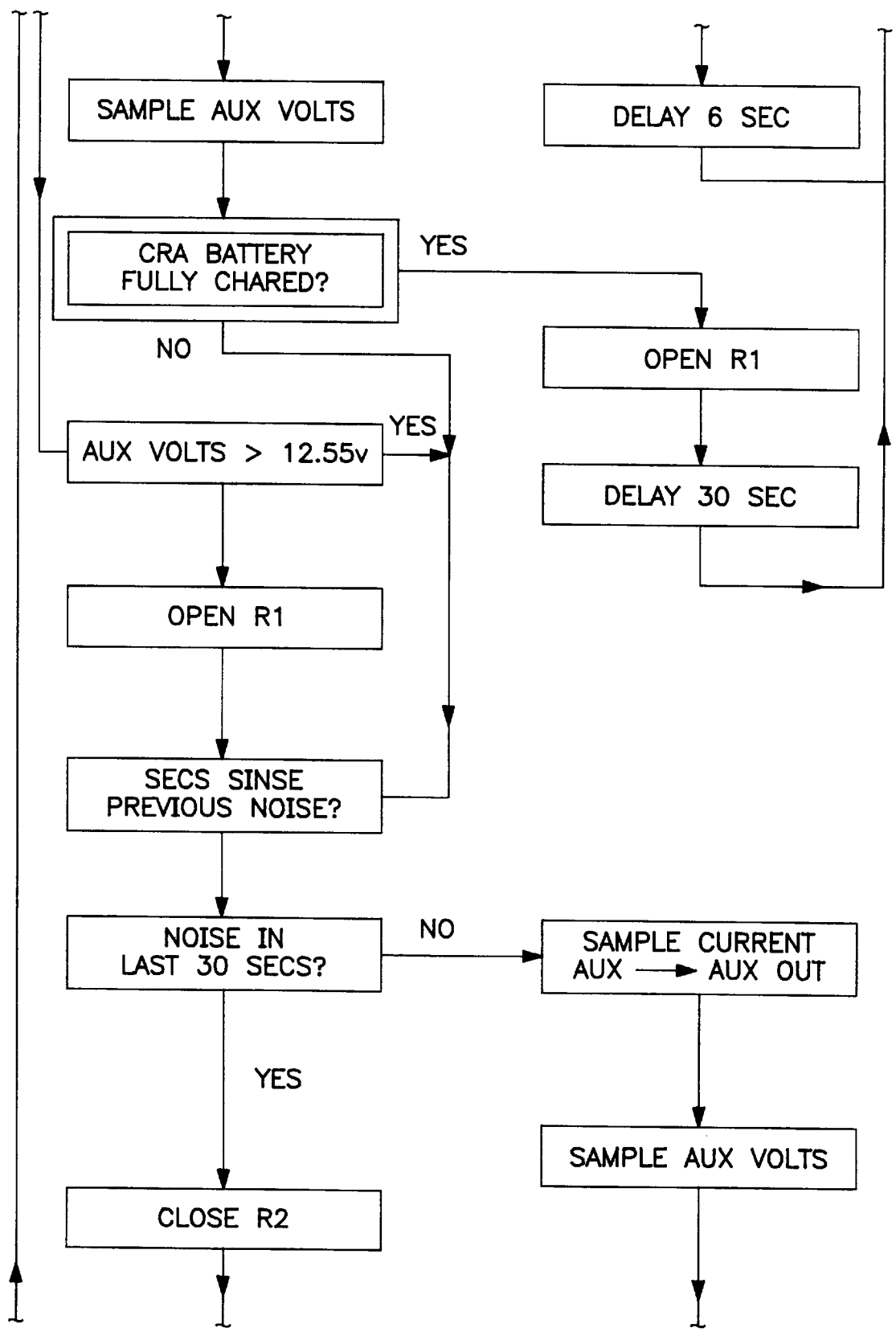
Figure 2C:
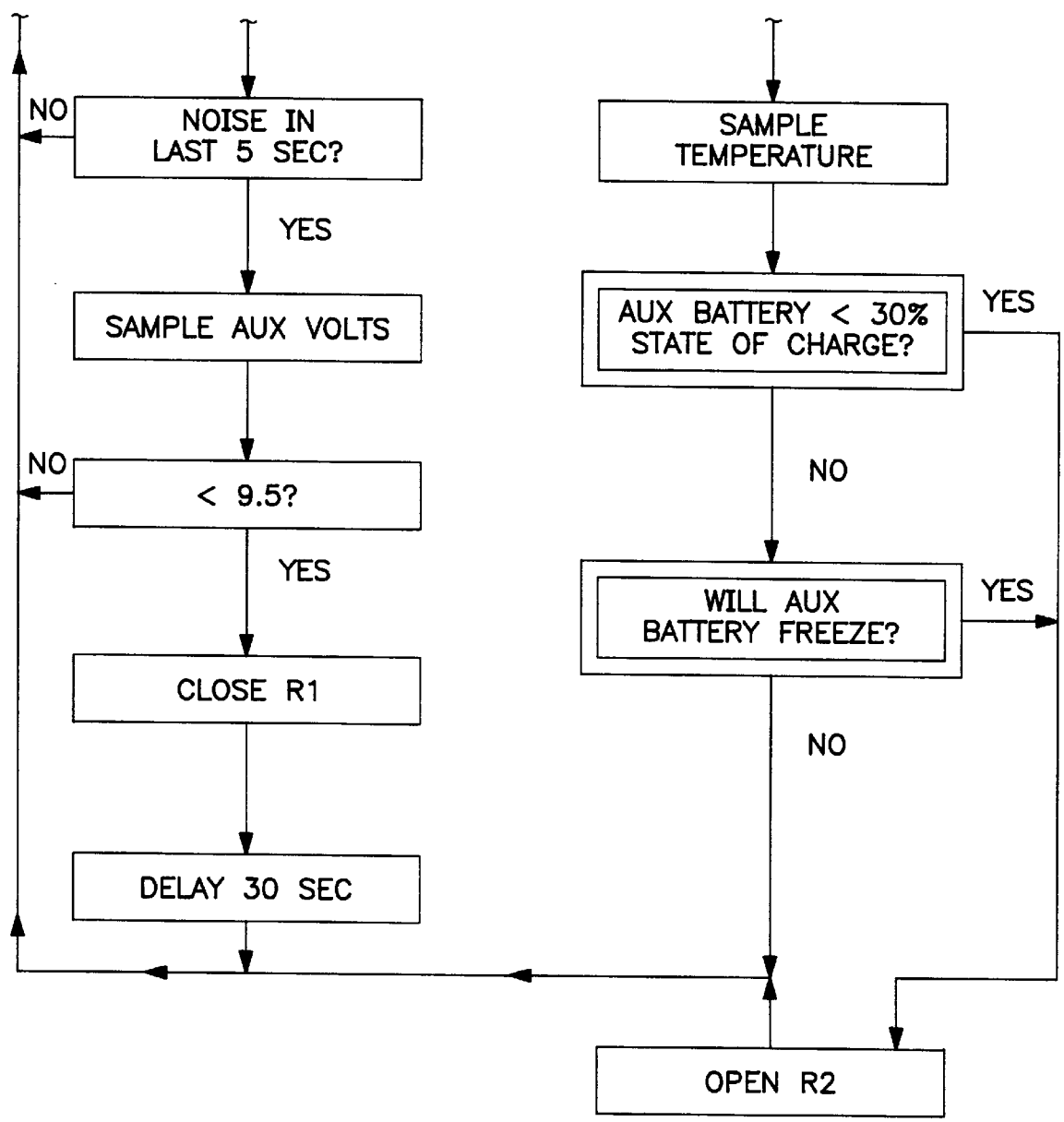

Referring to FIG. 2 the μP consumes only milliamps and runs as an auxiliary when the engine is running. FIG. 4 shows the inputs it receives are as follows:

1 (AUX) voltage
2 AUX current
3 Current flow from AUX to CRA
4 Temperature
5 Vehicle boarding
6 Engine run Outputs are as follows:

a R1
b R2 connect
c Transistor Q5 disconnect

The unit works as follows:

The vehicle has been driven with no AUX load. The AUX and CRA batteries are both charged. The noise detector indicates the vehicle is running. The driver parks the vehicle with no AUX load. R1 and R2 stay connected. The clock memory stays intact. R1 draws current. The state of charge falls. R1 cuts out.

If the driver now switches on the parking light and R1 has not already cut out, then R1 cuts out meanwhile the microprocessor samples the state of charge of the AUX battery periodically. When the state of charge falls to the preset threshold (adjusted by temperature) e.g at 20° C. then 10%; at –10° C. then 25%; at –35° C. then 60%; R2 cuts the AUX load. Thus the sidelights are eventually switched off leaving the battery still capable of starting the vehicle.

When the driver wishes to start the vehicle, the piezo detector senses the attempt and R2 cuts in providing ignition and the microprocessor ensures connection for 30 sec to enable a start. If AUX output is low, R1 cuts in to assist with ignition.

When running, R2 stays connected regardless of state of charge for safety's sake. If the vehicle did not start in the 30 sec allowed the microprocessor continues to sample the state of charge of the AUX battery and if it falls to the preset threshold R2 cuts out.

If the vehicle is started and driven, the alternator charges the CRA battery, the microprocessor samples the state of charge of the same and computes the state of charge making refinements based on temperature, current, voltage, battery capacity, battery age and others. Should the CRA battery be fully charged, R1 cuts out to prevent over-charging. If the CRA battery is undercharged then R1 remains closed.

A broken fanbelt would produce overheating problems from the failed coolant circulation much quicker than any failure of the auxiliaries. Should the alternator fail, so that the AUX state of charge falls, R2 and R1 stay closed and remain so until the vehicle eventually stalls through lack of voltage ignition. Under no circumstances would R2 cut out when the vehicle was being driven.

If there is internal switch failure e.g the voltage at the AUX terminal suggests the AUX battery can, at 13.5 v accept charge but the piezo detector reports no running then the system assumes the piezo has failed and a standby code prevents R2 from cutting out.

This type of battery tends to be used in four-wheel drive vehicles for military and civilian use, emergency vehicles and in boats where performance could be critical. Prioritising the discharge of the AUX battery ensures that in an emergency where the both batteries discharge, that the AUX battery falls to the minimum, too low for ignition while the CRA battery is still able to both crank the motor and supply ignition.

In boats where motion sensors like piezo devices are not useful the same type of switch is used to close R2 upon starting. Inductive pick ups close to electrical components such as spark plugs detect running where piezo devices are not practical.

Referring now to FIGS. 5–9 I have found the advantages of the above unit to be;

(a) R2 never cuts out while the vehicle is being driven.
(b) Battery freezing is unlikely
(c) The AUX battery output is maximised.
(d) Longer battery life.
(e) Prevents overcharging.
(f) Prevents excessive discharge of the AUX battery thereby extending its life.

Figure 5:
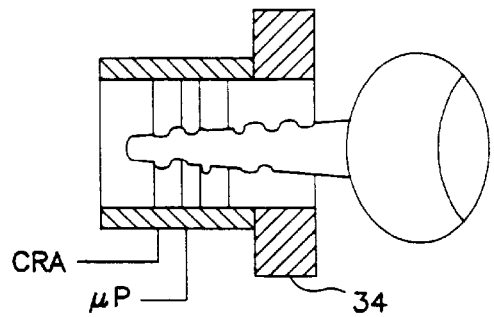
FIG. 5 is a diagram of a version with one switch acting between the like poles of the battery using isolated voltage detection.
Figure 6:
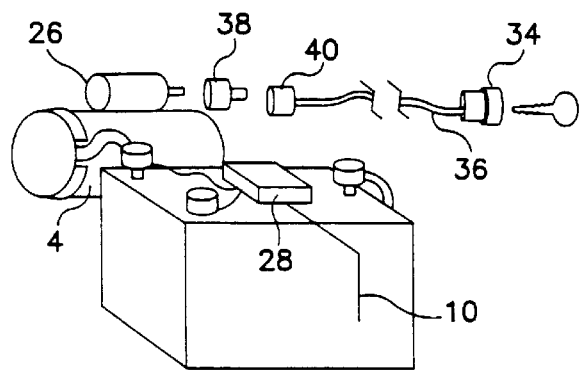
FIG. 6 is a perspective of the battery, starter motor and ignition switch for an automobile showing the manner of installation of the FIG. 5 version.
Figure 8:
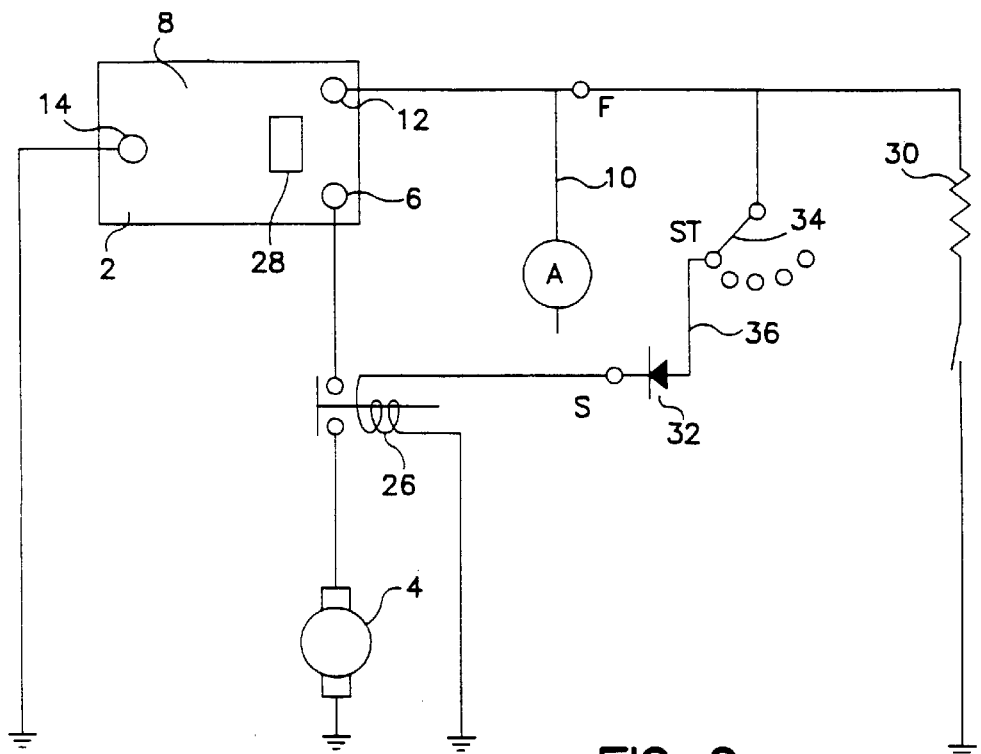
FIG. 8 is a diagram of part of the FIG. 5 version with an original equipment ignition switch containing extra contacts.
Figure 7:
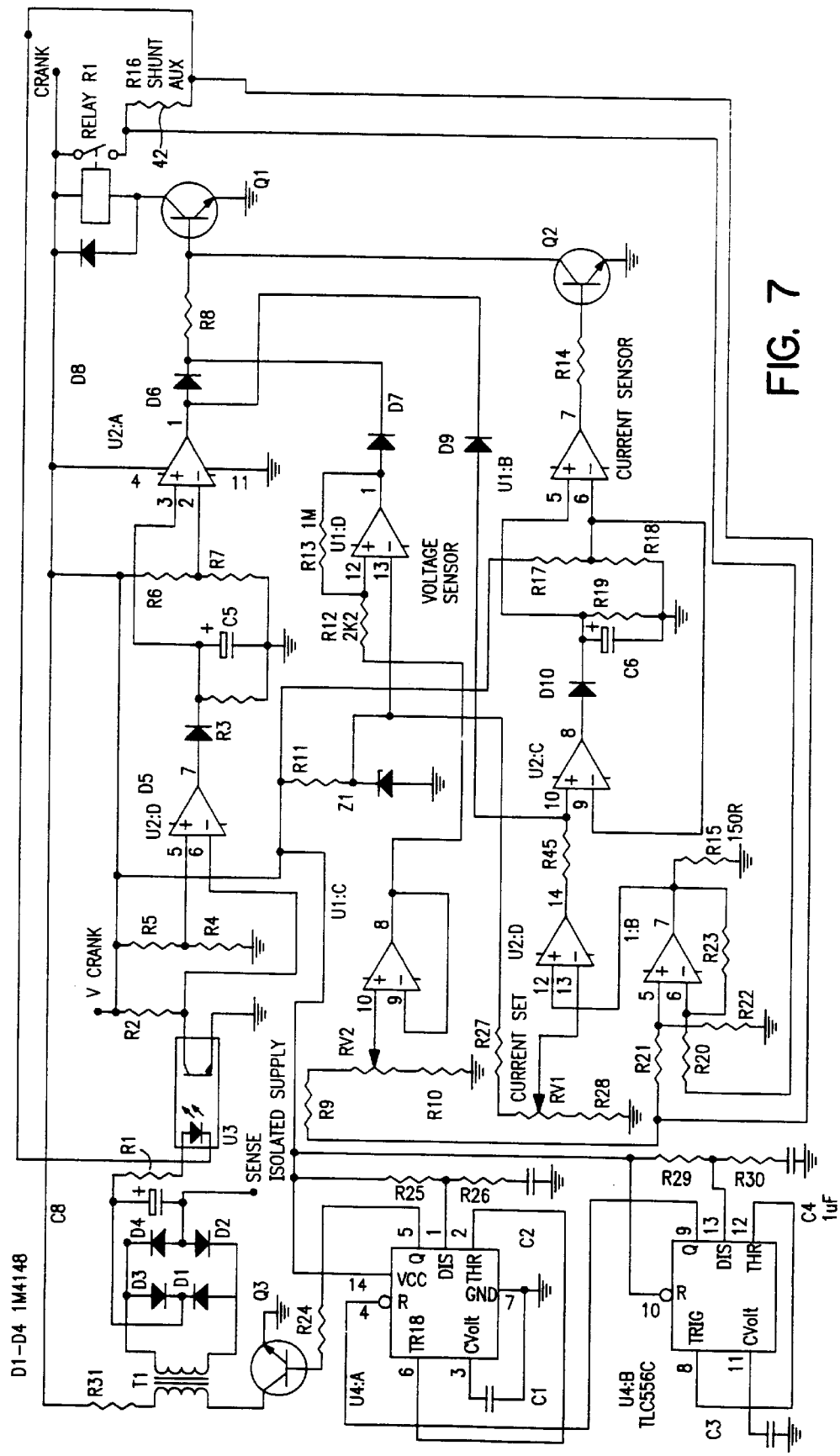
FIG. 7 is a circuit diagram of the FIG. 5 version.
Figure 9:
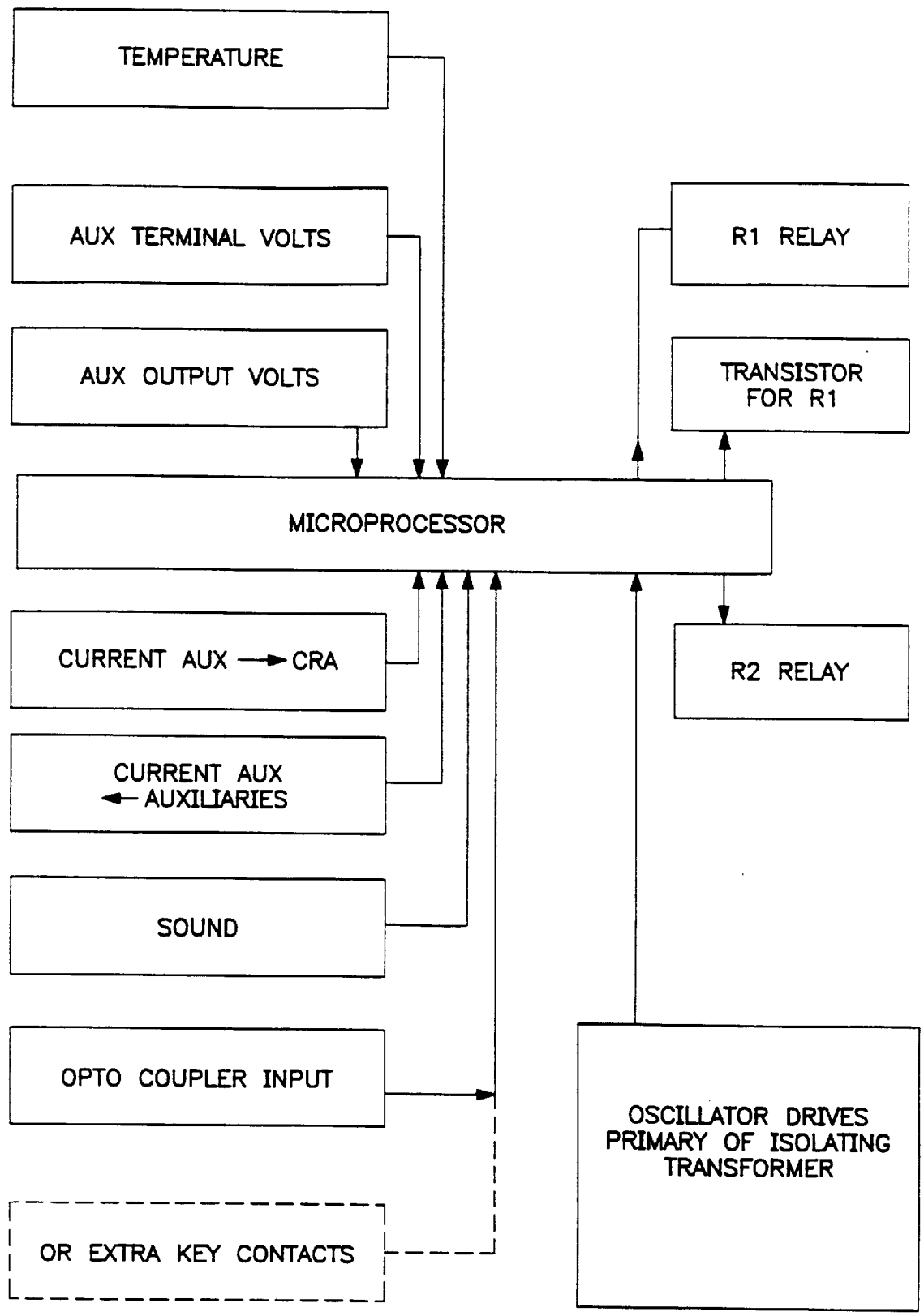
FIG. 9 is a block diagram of the inputs to and outputs from the microprocessor for the FIG. 5 version.

Referring firstly to FIG. 5, CRA battery 2 supplies starter motor 4 through pole 6. AUX battery is connected to the electrical auxiliaries A by conductor 10 from pole 12. Pole 14 is commonto both batteries. Like poles 6,12 are connected and disconnected by relay R1 which receives signals from the interface circuits of a microprocessor MP.

Cable 24 connects pole 8 to the starter motor 4 via starter solenoid 26. Lead 10 connects the AUX battery to the alternator A. Device 28 is connected between pole 6 and pole 12. Lead 10 also connects the AUX battery to other auxiliaries e.g lights 30. The isolated signal voltage is introduced at FEED IN, F and detected at SENSE, S. A blocking diode 32 is placed close to the key switch 34. The diode like the device 20 is an added component to the vehicle circuitry.

The introduction of both components is seen in FIG. 2. The switch 28 is shown close to the battery. The starter solenoid 26 is connected to key switch 34 by lead 36. Push on connector 32 containing the diode is interposed between solenoid 26 and tag 40 at the end of lead 36. This is connected to the ST position in the key switch 34.

Voltage Sensing

Figure 3:
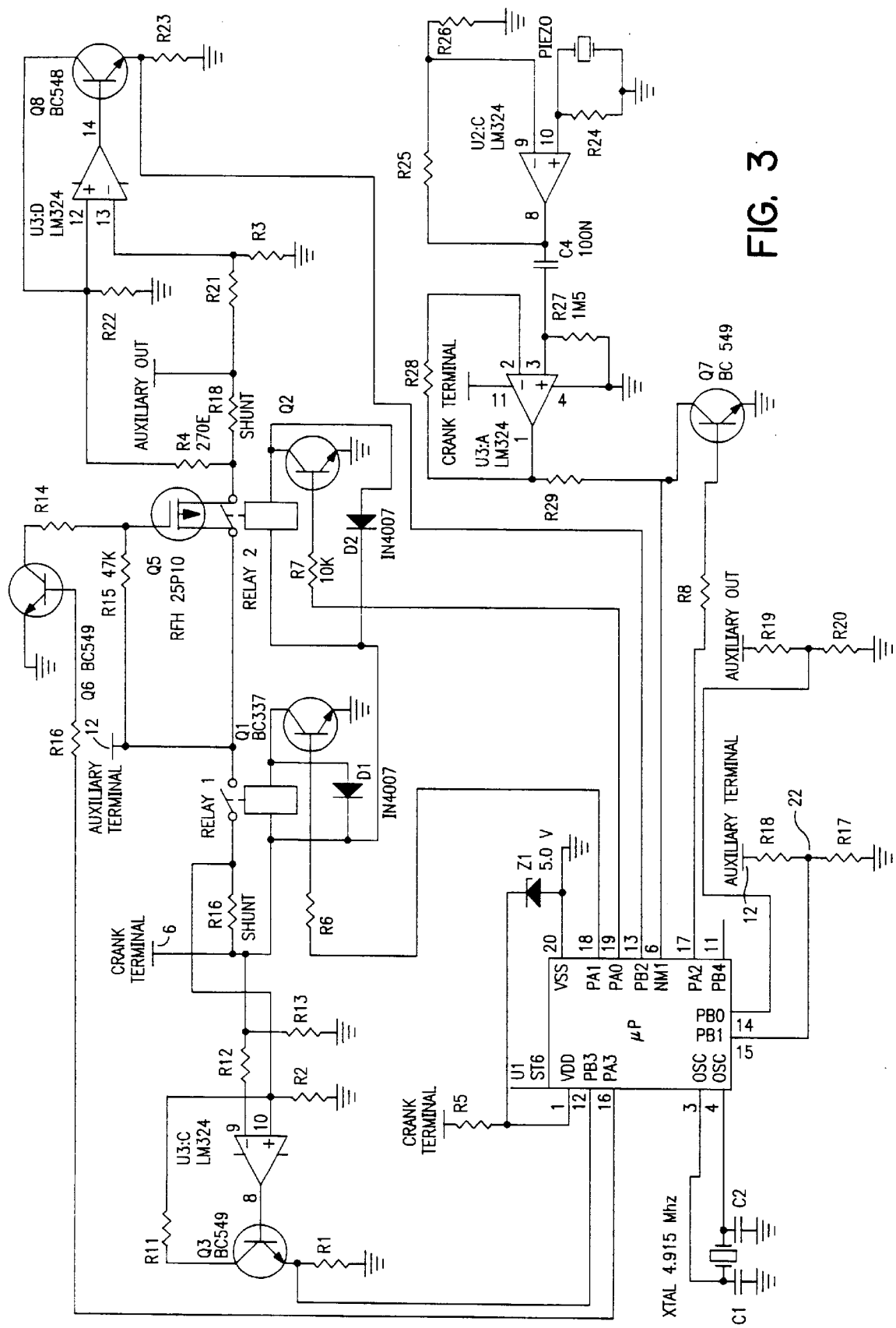
FIG. 3 is a circuit diagram of the device.
Figure 4:
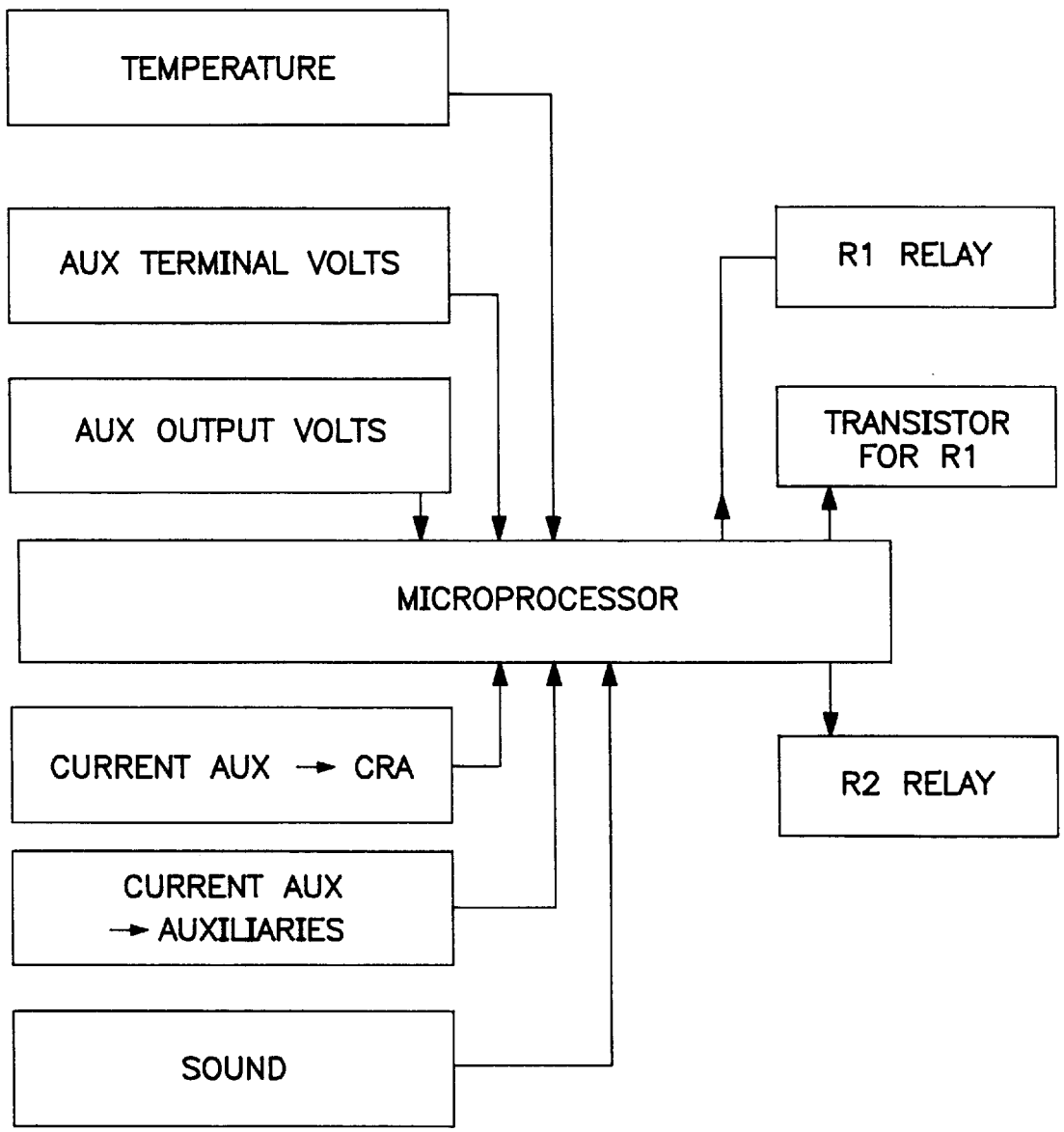
FIG. 4 is a block diagram of the circuit of FIG. 3 showing the inputs and outputs of the microprocessor.

Referring now to FIG. 3 this means of operating the relay R1 takes lowest priority. Voltage detection sesses the voltage of the AUX battery via R9; 10 and RU2. RU2 allows precise setting of the desired switching point. U1C is a voltage follower which buffers the input and presents the AUX voltage divided aproximately by ten to comparator U1D. The negative input to comparator is derived straight from precision ref Z1. When the AUX voltage /10 exceeds the ref voltage the output of U1D rises and via D7 will turn on Q1 allowing current to flow in the relay causing the relay to connect. Hysteresis is provided by R12;R13 reducing chatter and ensuring clean switching.

Thus the relay operates frequently in response to voltage sensing because the variations in engine speed and use of auxiliaries change continually.

Isolated Voltage Supply

U4 556 is configured as a dual oscillator to reduce power consumption in the switch. U4 B oscillates about 6 Hz and U4B about 6kHz, feeding the Q output of the B section to the reset input of A. Therefore on the base of Q3, a current amplifier, arrive short bursts of 6 kHz.

T1 is an isolation transformer whose output is bridge rectified by D1–4 and the resulting dc voltage is stored in capacitor C8. The generation of this separate dc voltage is necessary to avoid low resistance paths to the normal battery supply which are offered if the lights etc are left on.

U3 an optocoupler is used as the detection device. This provides a negative impulse on the input to comparator U2 B when the key is turned to START.

R3, D5 and C5 provide the latching of this pulse. The keyswitch detection will remain on for the time constant of R3-C5. U2A is configured as a comparator whose reference input is biassed to approx one fifth of crank voltage. As long as the voltage on the other input is higher than the reference voltage, the output will be high and thus turn on Q1 which provides a current through the relay R1 thereby connecting the AUX battery to the CRANK battery.

This supply is isolated from the current paths available in the auxiliary circuit in that the dc cannot utilise any of the available earth returns which chassis connections offer e.g lights and starter solenoid. Blocking diode 24 allows only unidirectional current flow.

If the driver's key is in the ST position the voltage will be detected and opto-coupler R1\R2 sends a short duration signal which is subject to gain by amplifiers U2:B and U2:A. The amplified signal switches transistor Q1 hard on and the relay R1 closes. The CRA battery provides cranking current. The AUX energises the coil and starter solenoid.

Capacitor C5 introduces a delay so that once the opto-coupler delivers only a brief voltage signal indicating to the switch that the driver wishes to start the vehicle, a 5 sec delay prevents the key switch being operated immediately again. This ensures that the relay remains at the command of the other sensors. The best start conditions exist when the relay is open and both batteries are contributing their inputs but if the auxiliay is discharged the vehicle will only start if the CRA battery is connected through the relay to the coil.

Overcurrent Protection

It must be remembered that the AUX battery cannot assist the CRA battery because the current levels are so different. Even so if the CRA battery suffers discharge for any reason, current will flow from the AUX battery as soon as the relay connects them e.g upon charging.

The excess current sensor is only intended to monitor current flowing from the AUX to the CRA battery (not the reverse) and then only to interrupt currents exceeding 40A. The purpose of the current sensor is to (a) protect the relay from damaging currents
(b) to separate the AUX and CRA batteries during starting to give a hot spark.

A thick copper wire shunt resistor 42 is connected between the two positive poles 6,8 within the switch 20.Excessive current protection only works in one direction only , namely from AUX to CRANK . Detection is the task of R16 which will drop about 100 mv at 50 A . Differential amp 1B references the drop across R16 shunt 42. This is fed to the positive input of comparator U2. The negative input of the comparator is fed from precision band gap reference Z1 via RV1 which is used to set the selected OCP trip point. When the output of 1B is greater than the point set by RV1 the output of U2 D will rise and feed to the positive input of a second comparator U2 C via R45. The negative input of comparator U2 C is based by R17, R18 at approx. one third crank volts. D9 will stop the positive input exceeding the negative input if keyswitch detection is not active. Thus excessive current protection will only work during key switch detection.

When the output of U2 C rises it initiates a delay created by D10, C6 and R19 which in turn feed comparator U1B. This output drives Q2 which removes any voltage driving Q1 on and the relay disconnects. The current sensor has priority over the voltage sensor and the key start sensors but it is enabled by the start sensor.

Installation Procedure

1 The wiring harness is divided by separating the cable supplying the starter motor from all the accessories.
2 The alternator must be on the auxiliary side of the harness.
3 The auxiliary harness is removed from the battery and the start lead from the start solenoid. A multimeter is used to check that a direct path exists between them when the key is turned to ST. There must be at least 10 k ohms impedance between them.

4 The diode 24 is included in the adapter in the lead 30 as shown in FIG. 2.

Interaction of Sensors

The vehicle is stationery with the relay open. Both batteries are charged. The key switch turns. The relay closes. The CRA battery cranks the motor. The AUX battery energises the coil.

The motor starts then idles. Auxiliaries are switched on. Voltage fall is sensed by the voltage sensor and the relay closes. Charging ensues. The vehicle stops. The relay opens. Lights are left on. The AUX battery discharges but the CRA battery charge is undisturbed. When the key is turned, the key operation has priority and the relay closes but the voltage sensor detects low voltage in the AUX battery. The relay stays closed and the CRA battery both cranks the motor and energises the coil.

I claim:

1. In a vehicle electrical system having a 3-pole battery containing an AUX battery for supplying electrical auxiliaries and a CRA battery, a device for connection between the like soles of the battery having,
   (a) a normally open switch connecting said CRA and AUX batteries,
   (b) a normally closed switch connecting the AUX battery to the electrical auxiliaries, and
   (c) sensing means which detects the state of charge of the AUX battery and any current from the AUX battery to the CRA battery and which
      (i) connects and disconnects the CRA battery and the AUX battery, and
      (ii) connects and disconnects the AUX battery to and from the electrical auxiliaries so as to enable a generator to charge both the CRA and AUX batteries and to meet fluctuating loads,
   and wherein the normally closed switch is a bistable relay.

2. A device according to claim 1, wherein the bistable relay has first and second coils and can be placed in a first state by a current pulse in the first coil and in a second state by a current pulse in the second coil.

3. A device according to claim 1, wherein the bistable relay comprises a switch having a conductive state and a non-conductive state and first and second coils, and wherein the switch changes from the conductive state to the non-conductive state by a current pulse in the first coil and changes from the non-conductive state to the conductive state by a current pulse in the second coil.

4. In a vehicle electrical system having a 3-Pole battery containing an AUX battery for supplying electrical auxiliaries and a CRA battery, a device for connection between the like poles of the battery having,
   (a) a normally open switch connecting said CRA and AUX batteries,
   (b) a normally closed switch connecting the AUX battery to the electrical auxiliaries, and
   (c) sensing means which detects the state of charge of the AUX battery and any current from the AUX battery to the CRA battery and which
      (i) connects and disconnects the CRA battery and the AUX battery, and
      (ii) connects and disconnects the AUX battery to and from the electrical auxiliaries so as to enable a generator to charge both the CRA and AUX batteries and to meet fluctuating loads and wherein the normally closed switch comprises two current conductors in parallel, both requiring maintenance current to maintain conduction, the current capacity and the maintenance current for one conductor being larger than for the other conductor, the sensing means being capable of selecting which conductor is more economical for the prevailing load.

5. A device according to claim 4, wherein the normally closed switch is a transistor and relay in parallel so that when the normally closed switch opens the transistor remains capable of conducting current from the AUX battery to the electrical auxiliaries.

6. A device according to claim 5, wherein the relay conducts 30–100 amp currents and has a quiescent maintenance draw of 100 ma–1 amp.

7. A device according to claim 5, wherein the transistor conducts 3–30 amp currents and has a quiescent maintenance draw of 1–10 ma.

8. In a vehicle electrical system having a 3-Pole battery containing an AUX battery for supplying electrical auxiliaries and a CRA battery, a device for connection between the like poles of the battery having
   (a) a normally open switch connecting said CRA and AUX batteries,
   (b) a normally closed switch connecting the AUX battery to the electrical auxiliaries, and
   (c) sensing means which detects the state of charge of the AUX battery and any current from the AUX battery to the CRA battery and which
      (i) connects and disconnects the CRA battery and the AUX battery, and
      (ii) connects and disconnects the AUX battery to and from the electrical auxiliaries so as to enable a generator to charge both the CRA and AUX batteries and to meet fluctuating loads,
   and wherein the sensing means comprises:
      data storage means suitable for storing data representing battery current, battery voltage and current from the CRA battery to the AUX battery,
      data entry means suitable for entering data concerning AUX battery current, AUX battery voltage, and current from the CRA battery to the AUX battery, and
      comparing means which compares the entered data with the corresponding stored data and generates signals which control the operation of the normally closed switch and signals which operate the normally open switch.

9. A device according to claim 8, wherein the data storage means, data entry means, and comparing means also process data concerning battery electrolyte temperature.

10. A device according to claim 8, wherein the sensing means includes a temperature recorder which records temperature and from the immediately preceding period adjusts the state of charge value at which disconnection of the normally closed switch occurs.

11. A device according to claim 10, wherein the period is 1–7 days.

12. A device according to claim 9, wherein the data storage means, data entry means, and comparing means also process data concerning vehicle disturbance which indicates vehicle operation.

13. A device according to claim 8, wherein the sensing means includes a piezo device which senses vehicle motion and closes the normally closed switch.

14. A device according to claim 8, wherein the sensing means samples voltage and current 25–100 times/sec.

15. A device according to claim 8, wherein the sensing means detects the auxiliaries output voltage.

16. A device according to claim 8, wherein the sensing means detects the current from the AUX battery to the electrical auxiliaries.

17. A device according to claim 8, wherein the sensing means utilizes the entered data to close the normally open switch when (a) the CRA battery requires charge (b) the AUX battery is discharged to the level where the CRA battery contributes current to the electrical auxiliaries.

18. A device according to claim 8, wherein the sensing means utilizes at least part of the entered data to open the normally open switch when the current from the AUX battery to the CRA battery is less than the predetermined value indicating adequate charge.

19. A device according to claim 8, wherein the sensing means utilizes the entered data to open the normally closed switch when the charge in the CRA battery falls to a predetermined minimum.

20. A device according to claim 8, wherein the sensing means utilizes the entered data to close the normally closed switch when the electrical system starts up.

21. A device according to claim 8, wherein the normally open switch is open and the normally closed switch is closed when a requirement for a vehicle start is anticipated and the state of charge of the CRA battery and AUX battery are according to data.

22. A device according to claim 8, wherein the normally open switch is closed and the normally closed switch is closed when a requirement for a vehicle start is anticipated and the state of charge of the CRA battery is adequate but the state of charge of the AUX battery is lower than the predetermined value in the data.

23. A device according to claim 8, wherein in the event of charging failure, the normally open switch is opened and closed intermittently and the normally closed switch is closed whereby the AUX battery is discharged first in order to preserve the capability of the CRA battery to start the vehicle, while contributing current intermittently to the electrical auxiliaries.

* * * * *